United States Patent [19]

Nielsen

[11] Patent Number: 4,973,263
[45] Date of Patent: Nov. 27, 1990

[54] ELECTRICAL SPLICE ASSEMBLY

[75] Inventor: Wyn Y. Nielsen, La Jolla, Calif.

[73] Assignee: Solatrol, Inc., San Diego, Calif.

[21] Appl. No.: 334,040

[22] Filed: Apr. 4, 1989

[51] Int. Cl.⁵ ............................................. H01R 9/08
[52] U.S. Cl. .................................................... 439/438
[58] Field of Search .................................. 439/436–441

[56] References Cited

U.S. PATENT DOCUMENTS 2,780,791  2/1957  Morschel ............................ 439/438
3,633,148  1/1972  Thorsman ........................... 439/438

Primary Examiner—Joseph H. McGlynn
Attorney, Agent, or Firm—Dressler, Goldsmith

[57] ABSTRACT

A sealed cable splice is disclosed for use in connecting electrically controlled sprinkler valves or other electrical or electronic devices to a control unit. A dual conductor polarity-keyed cable is stripped of its insulation at the end of the cable exposing the bare conductors which are then inserted into a polarity-preserving matching hole in the end of the splice. The exposed conductor enters into a socket area and then into an interior chamber of the splice where it is cinched by a electrical connector that allows a wire to be inserted but not removed. The insulation from a second cable is removed at the end of that cable and is inserted into the other side of the splice in a similar manner. Connection is now made between the two cables. The splice, has previously been filled with a displaceable sealant so that when the conductors are inserted into the splice, the sealant is displaced and forms a seal around the cables and the electrical connection. Also provided is a shorting switch which makes an electrical short between the two conductors of the cable. This provides an electronic signal to the control unit identifying the wires being connected, and eliminating the need for premarking or color coding wires.

18 Claims, 3 Drawing Sheets

ELECTRICAL SPLICE ASSEMBLY

DESCRIPTION

The invention is related to sealed splices for electrical cables intended for use outdoors, in greenhouses, underground (direct burial), underwater, in rugged industrial environments or in other similar environments. Existing splices such as a "wire nut" require the conductor cables to be stripped of their insulation. The bare conductors are then twisted together and the wire nut is screwed on over the conductors providing a secure mechanical and electrical connection. Wire nut splices can be sealed by use of standard electrical tape or by sealing the wire nut in an insulating container or "potting cup" containing a sealant material and having openings for the conductor cables when the container is closed around the wire nut. Alternatively, a liquid sealant such as silicone rubber can be poured into the potting cup wherein it will harden around the wire connection. While this arrangement provides a good seal for electrical connections, it does not provide mechanical tensile strength. Also, the connection is bulky in completed form, and the potting compound is messy. It is also time consuming to use in that the cables must be stripped, the wire nut twisted on and the plastic pouch is then closed around the connection. Various examples of this type of sealing system include a 3M, DBY, Direct Bury Splice Kit; a Richdel Gel-Tite Waterproof Wire Connector; and a SPEARS DRI-SPLICE, DS-100 splice.

Other types of splices involve a metallic tube arrangement covered by an insulator wherein a stripped end of an insulated wire is inserted into the splice and a crimping tool is used to make a mechanical connection between the wire and the splice. This arrangement may also be sealed by a sealant filled plastic tube that is closed around the splice. Another type of splice is Raychem's heat-melt system wherein conductors are inserted into the splice and heat is applied to electrically and physically connect the conductors.

When splices are installed in multiple cable arrangements it is sometimes necessary to mark the cables with special colors or numbers so that the wires can be correctly identified and connected at a termination point such as a control unit.

In an irrigation system it is common to have several sprinkler circuits wherein each circuit has an electrically actuated sprinkler valve. Each sprinkler valve is in turn connected to a common control unit that may control six, eight or many more sprinkler circuits. Some controllers, such as central station systems may control hundreds of valves. In this type of arrangement, it is necessary to correlate each cable with each valve so that the sprinkler circuits are correctly connected to the control unit. Common schemes for identifying cables include color coding or attaching numbers to the cables when the cables are installed.

A need therefore exists for a easy to use permanent electrical splice that provides a rapid assembly, low-bulk connection, resistance to contamination and moisture, mechanical wire tension strength, a secure electrical connection and a means of identifying the spliced cables so that each cable is correctly connected to a control unit.

BRIEF SUMMARY OF THE INVENTION

The present invention is an easy to use electrical splice for splicing single or multiple conductors such as conductors used to connect an electrically actuated sprinkler valve to a control unit.

In a preferred embodiment the splice is used to connect one end of a keyed dual conductor cable coming from a control unit with a like dual conductor cable coming from an electronically actuated sprinkler valve. When installing the splices, the ends of the keyed dual conductors are stripped of their insulation leaving approximately ¾ inch of bare wire on each cable end. The dual conductor cables are then inserted into a socket area located on each end of the splice. As the cables are inserted, the bare wires are guided from the socket areas of the splice into an interior chamber. The interior chamber contains two electrical connection strips which are flat strips of hardened beryllium coper, or other similar conductive spring material, with each end of the strip bent upward approximately 120° from the flat position. When the bare wires pass into the interior chamber they slip between the interior chamber cover and the ends of the electrical connection strips until the keyed insulated portion of the dual conductor cable rests against the end of the keyed socket area closest to the interior chamber. With the cable in this position, the cable is permanently locked into the splice because the wires are wedged, or cinched, between the connection strips and the interior chamber cover. Thus, the completed splice can withstand tensile loads on the connected wires.

The interior chamber and socket areas of the splice have previously been filled with a displaceable sealing material that is displaced as the cable is inserted into the splice causing the electrical connection between the cable wires and the connection strips to be sealed along with the insulated cable portion resting in the socket area of the splice. This makes an effective weather resistant seal protecting the electrical connection from moisture and other contaminants commonly found in an outdoor or wet environments.

Another aspect of the invention is a normally-open momentary close type shorting switch located in the interior chamber of the splice. The shorting switch is accessible from outside the splice via a small hole located in the interior chamber cover. To make an electrical short between the two electrical connection strips a wire is inserted into this hole and is pressed down on an actuation button of the switch thereby shorting the two connection strips without exposing them to the outside environment. When the two electrical connection strips are shorted, the control unit can identify that particular cable, electronically, thereby eliminating the necessity of color coding or number coding each cable to identify the particular circuit connected by that cable. A normally-closed momentary-open switch could be used to connect the wires in an arrangement where the electrical connection strip is split at its center into two wire contacts and the contacts joined by a normally-closed momentary-open switch.

Therefore it is an object of the present invention to provide a keyed permanent splice that is easy to install and that seals the electrical connections made by the splice from moisture and other contaminants commonly found in an outdoor or other harsh environments.

It is also an object of the present invention to provide a means for shorting the conductors of a dual conductor cable allowing electronic identification of that particular cable.

Additional objects and features of the invention will appear from the following description in which the preferred embodiments of the invention have been set forth in detail in conjunction with the drawings.

DETAILED DESCRIPTION OF THE INVENTION

A preferred embodiment of the present invention is a dual conductor splice for use when connecting an electrically actuated fluid valve with its control unit. A splice connection is easily made by stripping the insulation from the end of a first dual conductor cable coming from the control unit and stripping the insulation from the end of a second dual conductor cable coming from the fluid valve. These cable ends are then simply inserted into the splice thereby making a physically secure and permanent electrical and mechanical connection that is sealed from moisture and contaminants. A shorting switch, located in an interior chamber of the splice, is then activated causing a temporary short between two electrical conduction strips. This tells the control unit which cable has been activated.

The present invention is described as useful when connecting various components of an automated outdoor sprinkler or irrigation systems. However, other uses for the splices of the present invention will be obvious to a person of ordinary skill in the art.

The construction of the splice assembly as well as its operation will now be discussed with reference to FIGS. 1, 2, 3, and 9.

Figure 1:
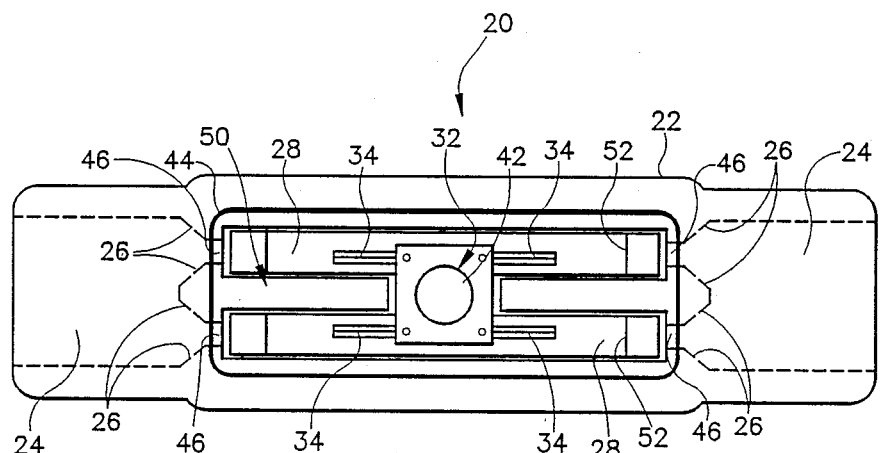
FIG. 1 is a top view of a dual conductor splice with the interior chamber cover removed.

FIG. 1 shows a top view of the splice assembly 20 with its various components parts. The splice includes the splice housing 22, socket areas 24, each socket area 24 having tapered areas 26, holes 46 and an interior chamber area 50. Located in the interior chamber 50 are two flat connector strips 28 and switch 32. Switch 32 has four switch arms 34 which rests upon the beryllium copper flat connector strips 28 as shown in FIG. 1. The housing 22 is made of black 10% glass filled ABS which has low water absorption, high strength and good resistance to UV light, thermal cycling, abrasion and mechanical shock, chemical attack, and is an excellent electrical insulator.

Figure 2:
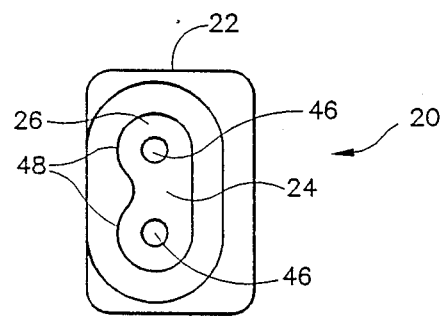
FIG. 2 is an end view of a keyed socket area of the splice.

FIG. 2 shows an end view of splice 20 showing housing 22, socket area 24, tapered areas 26 and holes 46. FIG. 2 also shows a keyed portion 48 of the socket area 24 that allows a two conductor cable, that is similarly keyed, to be inserted only one way in socket area 24. This feature provides polarity preservation when two wires are spliced.

Figure 3:
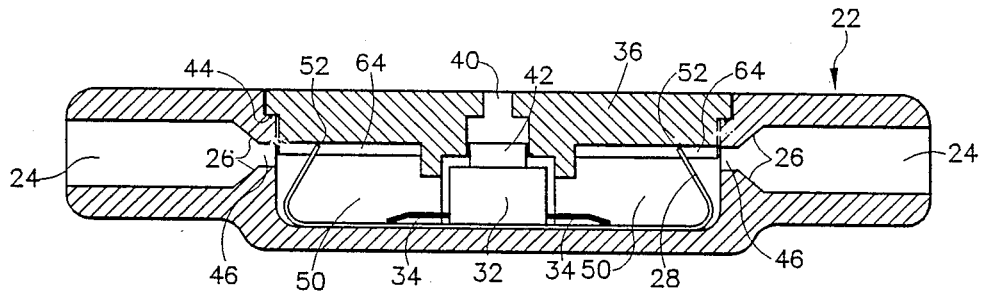
FIG. 3 is a side cross section view of the splice.
Figure 9:
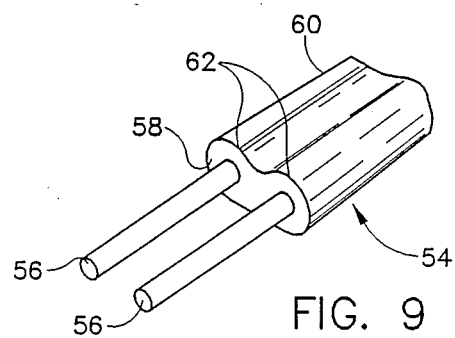
FIG. 9 is a perspective view of a keyed dual conductor cable.

Turning to FIGS. 3 and 9, the unique features and operation of the splice will now be described. FIG. 9 shows a two conductor keyed cable 54, such as the special wire used in the LEIT TM 8000 Irrigation Mangement System by Solatrol, Inc. having two conductors 56, insulation 60 and keyed areas 62. The keyed area 62 of cable 54 corresponds to the keyed area 48 of socket area 24 as shown in FIG. 2.

The sequences of establishing a splice begins with the removal of the insulation 60 to point 58 leaving conductors 56 exposed as shown in FIG. 9. The exposed area of conductor 56 is approximately ¾ inch long.

With reference to FIG. 3, the conductors 56 are inserted into socket area 24 along with the insulation portion 60 of cable 54. The keyed portion 62 of cable 54 is matched to the keyed portion 48 of the socket area 24. As the conductors 56 reach the tapered portion 26 of socket area 24, they are guided into holes 46 by the tapered areas 26. The conductors 56 then pass into interior chamber 50 until they contact the tips 52 of the connector strips 28. The tips 52 of the connector strips 28 are also shown in FIG. 1. As the cable 54 is further inserted into the socket area 24, the conductors 56 displace the tips 52 of the connector strips 28 and pass between an interior chamber cover 36 and the tips 52. Cable 54 is inserted until area 58 (FIG. 9) rests again the tapered area 26 (FIG. 3) at the end of socket area 24. At this point, the tips 52 are pressing upwardly against the conductors 56 which in turn presses against the interior chamber cover 36 which is the same material as the housing 22. If an attempted is made to remove the conductors 56 from the chamber area by pulling on cable 54 the conductors 56 are cinched between the tips 52 and the chamber cover 36. During the manufacturing process of the connector strips 28, the tips 52 are not deburred which leaves a sharp edge that aids in the cinching process by creating more friction between the tips 52 and the conductors 56. The entering wire end causes the spring contact to bend approximately 15° more, so that when the wire is fully inserted, the edge of the spring contact is jammed against the wire at a 45° contact angle thus providing maximum wire retention force.

Also located in the interior chamber 50 of splice 20 is switch 32 which is a small keyboard-type switch manufactured by Toko. A top view of switch 32 shown in FIG. 1 and the side view of switch 32 is shown in FIG. 3. As shown in FIG. 1, switch 32 has four connector arms 34 which are attached to the connector strips 28 by soldering or welding. This is also shown in FIG. 3. When the splice 20 is assembled, connector strips 28 are inserted into interior chamber 50 and the switch 32 is placed in interior chamber 50 and the arms 34 of the switch 32 are soldered to the connector strips 28. The interior chamber cover 36 is then inserted into place as shown in FIG. 3. Access to the switch button 42 of switch 32 is through hole 40 in the chamber cover 36 as shown in FIG. 3. The purpose of the switch is to electrically short the connector strips 28 by depression of the switch button 42.

Providing a shorting mechanism such as that shown is useful in identifying the cable being spliced. For instance, if the cable is attached to a control unit and the splice has been connected between the control unit and an electronically actuated valve, a simple push of the switch button 42 makes a short between the cable conductors that provides an electrical indication to the controller which identifies that particular cable at the controller end. If this switch activation is done sequentially, starting, for example, at the valve desired to be identified as #1, the controller can easily be designed to recognize and record the ordered assignment of each wire to a particular valve station number. This eliminates the needs for color coding or number coding wires thereby simplifying the installation process. This is useful in a system such as that described in the U.S. patent application entitled "Flexibly Programmable Irrigation System Controller" filed on Sept. 28, 1988, Ser. No. 250,841, Docket Number SOL 0002P by Wyn Y. Nielsen, Steven C. Carlin and Dennis A. Kaiser which is hereby incorporated by this reference.

During the assembly of the splice 20, an electrically insulating, but displaceable sealant compound such as electrical contact grease or preferably a self-healing displaceable (other compounds?) insulating compound, as manufactured by Raychem, is inserted into the interior chamber 50 and the socket areas 24. When the cable 54 is inserted into the socket areas 24, the sealant is displaced thereby sealing the electrical connection between the tips 52 of the connector strips 28 and the conductors 56 of the cable 54. The sealant also surrounds the insulated portion 60 of cable 54 where it rests in the socket area 24. This provides a water resistant splice that is designed for outdoor use and prevents the contamination or corrosion of the electrical connection between the connector strips 28 and the conductors 56. This splice is also permanent in that the tips 52 of connector strips 28 resist any attempt to remove the cable 54 from the splice 20.

Figure 8:
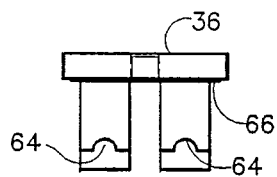
FIG. 8 is an end view of the interior chamber cover.

With reference to FIG. 8, FIG. 8 is an end view of the interior chamber cover 36, which shows half-round guide areas 64. Half-round guide areas 64 are also shown in FIG. 3. The purpose of the half-round guide areas 64 is to guide the conductors 56 as they enter the interior chamber 50 and to further aid the cinching process by increasing the area of surface contact between the chamber cover 36 and the conductors 56 thereby increasing cinching friction if an attempt is made to remove cable 54 from splice 20.

Figure 4:
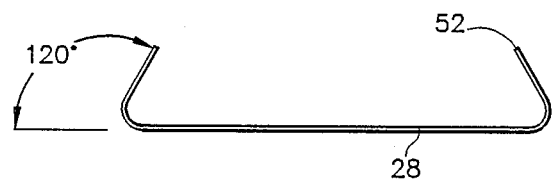
FIG. 4 is a side view of an electrical connection strip.
Figure 5:
FIG. 5 is a top view of the electrical connection strip.

Turning to FIGS. 4 and 5, FIG. 4 is a side view of a connector strip 28 and FIG. 5 is a top view of the same connector strip 28. As shown in FIG. 4, the tip portion 52 is bent approximately 120° from the flat position. This angle provides excellent cinching action between the tips 52 and the conductors 56. The connector strip 28 is made from beryllium copper material that is fully spring tempered.

Figure 6:
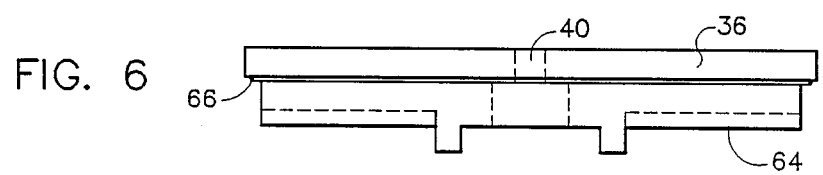
FIG. 6 is a side view of the interior chamber cover.
Figure 7:
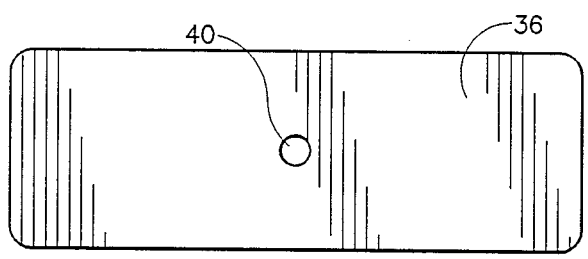
FIG. 7 is a top view of the interior chamber cover.

Turning now to FIGS. 6 and 7, FIG. 6 is a side view of the chamber cover 36 that shows the hole 40 that allows access to the switch button 42 and half-round guide channel 64. FIG. 7 is a top view of the interior chamber cover 36 showing the location of hole 40 for access to the switch button 42.

FIG. 6 also shows a ridge 66 which corresponds to indentation 44 as show in FIGS. 1 and 3. The ridge 66 is also shown in FIG. 8. The purpose of ridge 66 and indentation 44 is to aid in the ultrasonic welding of the interior chamber cover 36 to the splice housing 22. The chamber cover 36 is ultrasonically bonded or welded to splice housing 22 after the connectors 28, the switch 32, and the sealant (not shown) are placed in interior chamber 50.

Figure 10:
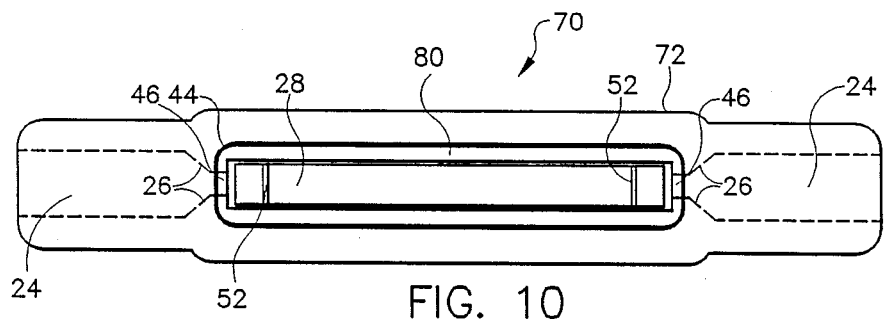
FIG. 10 is a top view of a single conductor splice.
Figure 11:
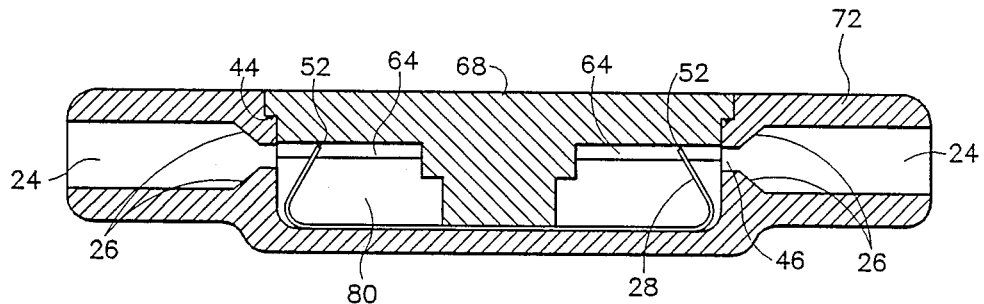
FIG. 11 is a side view of a single conductor splice.

An alternate embodiment of the invention is shown in FIGS. 10 and 11. In the alternate embodiment shown in FIG. 10, one single conductor cable is spliced to another single conductor cable. The splice for accomplishing this connection has only one connector strip 28 and does not have a switch 32. As with the 2-conductor version, this version could have a momentary open switch joining two wire contact strips. If each wire returns to the controller through a low impedence device or circuit, the controller could recognize a momentary open produced by the activation of the switch inside the splice. The socket areas 24 can either be keyed or not keyed as this becomes less important when only one conductor is being spliced. The essential construction and operation of the single connector splice 70 is the same as that of the dual conductor splice. Specifically, the displacement of the sealant, the connection of the cable to the splice, and the ultrasonic welding of the interior chamber cover 68 (FIG. 11) to the splice housing 72 is the same. A bare conductor (not shown) is inserted into the socket area 24 (FIG. 11) until it contacts the guide area 26 which in turn guides the conductors through hole 46 and into interior chamber 80 where the conductor passes between the tip 52 of flat connector strip 28 and interior chamber cover 68. The insulation of the cable rests against the tapered area 26 of the socket area 24. The cinching action is the same as that described with respect to the dual conductor splice 20. The interior chamber cover 68 has guide areas 64 and is ultrasonically bonded to housing 72 using ridges 66 and depressions 44 as previously described.

FIGS. 1 and 3 show a socket area on each end of the splice. However, it may be desireable to provide a splice in which one side of the splice is permanently connected to a cable at the factory and the other end of the splice is designed to operate as previously disclosed. This arrangement would be applicable to both the single and dual splices. In this embodiment, the electrical connection made at the factory between the cable and the splice could be welded, soldered or attached in some similar manner. Also, the insulation portion conductor cable could be permanently bonded in the socket area and sealed at the factory.

With reference to the single or dual conductor splices, the housings of such splices are designed to present a completed connection of wire cables that is small in size (nearly the same cross section as the wire cable itself), and smoothly shaped, i.e., free of protruberances such that the spliced cable can be easily pulled through conduits, wire trays or lofts, earth trenches, underwater or through other media without undesireable mechanical stress and resistance.

While the invention has been particularly shown and described with references to preferred embodiments thereof, it will be understood by those skilled in the art that the foregoing and other changes in form and detail may be made therein without departing from the spirit and scope of the invention.

What is claimed is:

1. A splice assembly for connecting one dual conductor cable to a second dual conductor cable comprising:
   housing means having an interior chamber, a first socket area, a second socket area, a first electrical connector means and a second electrical connector means, said first and second electrical connector means being located in said interior chamber, said first socket area being located on a first side of said interior chamber and said second socket area being located on a second side of said interior chamber, said first and second socket areas each having a guide means located adjacent to said interior chamber, each said guide means having two openings for allowing each conductor of a dual conductor cable to pass from said first socket area or said second socket area through said openings and into said interior chamber wherein said first electrical connector means is adapted to cinch one wire of a dual conductor cable as said wire enters said interior chamber and said second electrical connector means is adapted to cinch the other wire of said dual conductor cable as said other wire enters said interior chamber thereby making a cinched electrical connection between each conductor of one dual conductor cable when inserted into said first socket area and each conductor of another dual conductor cable when inserted into said second socket area.

2. A splice assembly as in claim 1 including:
sealant means located in said interior chamber and said first and said second socket area, said sealant means is adapted to be displaced and to seal said first and second electrical connectors when said dual conductor cables are inserted into said first and second socket areas.

3. A splice assembly as in claim 2 including:
shorting means located in said interior chamber, said shorting means is connected to said first and second electrical connector means and is accessible from an area exterior to said interior chamber for making an electrical short between said first and second electrical connector means.

4. A splice assembly as in claim 3 wherein,
said first and second socket areas are keyed to accept correspondingly keyed dual conductor cables.

5. A splice assembly as in claim 1 including:
shorting means located in said interior chamber, said shorting means being accessible from an area exterior to said interior chamber for making an electrical short between said first and second electrical connectors.

6. A splice assembly as in claim 2 including:
shorting means located in said interior chamber, said shorting means is connected to said first and second electrical connector means, said shorting means is a normally open push button switch, said push button is accessible from an area exterior to said interior chamber, said shorting means is for making an electrical short between said first and said second electrical connector means when said switch button is depressed.

7. A splice assembly as in claim 1 wherein,
said first and second socket areas are keyed to accept correspondingly keyed dual conductor cables.

8. Splice assembly for connecting one dual conductor cable to a second dual conductor cable comprising:
housing means having an interior chamber, a socket area, a first electrical connector and a second electrical connector, said first and second electrical connectors being located in said interior chamber, said socket area being located on one side of said interior chamber, a first dual conductor cable being connected to said interior chamber, one conductor of said dual conductor cable being connected to said first electrical connector and the other conductor of said dual conductor cable being connected to said second electrical connector, said socket area having a guide means located adjacent to said interior chamber said guide means having two openings for allowing each conductor of a second dual conductor cable to past from said socket area through said openings and into said interior chamber wherein said first electrical connector is adapted to cinch one conductor of said second dual conductor cable as said conductor enters said interior chamber and said second electrical connector is adapted to cinch the other conductor of said second dual conductor cable as said other conductors enters said interior chamber thereby allowing a cinched electrical connection between each corresponding conductor of said first dual conductor cable and said second dual conductor cable.

9. A splice assembly as in claim 8 including:
displaceable sealant means located in said interior chamber and said socket area said sealant means is adapted to be displaced and to seal said first and second electrical connectors when said second dual conductor cable is inserted into said socket area.

10. A splice assembly as in claim 10 including:
shorting means located in said interior chamber, said shorting means being accessible from an area exterior to said interior chamber for making an electrical short between said first and second electrical connectors.

11. A splice assembly as in claim 10 wherein,
said socket area is keyed and said second dual conductor cable is correspondingly keyed.

12. A splice assembly as in claim 8 including:
shorting means located in said interior chamber, said shorting means being accessible from an area exterior to said interior chamber for making an electrical short between said first and second electrical connectors.

13. A splice assembly as in claim 8 wherein,
said socket area is keyed and said second dual conductor cable is correspondingly keyed.

14. Splice assembly for connecting two cable ends comprising:
housing means having a first end and a second end each end having a socket area for receiving insulated cable, said insulated cable having an exposed end wherein said insulation is removed from said cable,
interior chamber means in between said first end and said second end said interior chamber means housing an electrical connection means for connecting and cinching the exposed portion of an insulted cable when said cable is inserted into said socket area of said first end and for connecting and cinching the exposed portion of a second insulated cable when said second insulated cable is inserted into said socket area of said second end.

15. A splice assembly as in claim 14 including:
sealant means, located in said interior chamber means and in the socket area of said first and second ends, said sealant means is adapted to be displaced by said insulated cables when said cables are inserted into said socket areas, said sealant means for sealing the electrical connection from contaminants.

16. A splice assembly for connecting one dual conductor cable to a second dual conductor cable comprising:
housing means having an interior chamber, a first socket area and a second socket area said interior chamber being located between said first socket area and said second socket area,
electrical connection means located in said interior chamber said electrical connection means is adapted to electrically connect a first dual conductor cable inserted into said first socket area with a second dual conductor cable inserted into said second socket area said electrical connection means being adapted to firmly grip each conductor of said first and second dual conductors cables, and sealant means located in said interior chamber and said first and second socket areas, said sealant means is displaceable and is adapted to seal said electrical connections means and said first and second dual conductor cables when said cables are inserted into said first and second socket areas.

17. A splice assembly for connecting one dual conductor cable to a second dual conductor cable comprising:

housing having an interior chamber, a first socket area and a second socket area said interior chamber being located between said first socket area and said second socket area, electrical connection strips located in said interior chamber said electrical connection strips are adapted to electrically connect a first dual conductor cable inserted into said first socket area with a second dual conductor cable inserted into said second socket area said electrical connection strips being adapted to firmly grip each conductor of said first and second dual conductors cables, and sealant material located in said interior chamber and said first and second socket areas, said sealant material is displaceable and is adapted to seal said electrical connections strips and said first and second dual conductor cables when said cables are inserted into said first and second socket areas.

18. A dual conductor cable comprising:

a dual conductor cable having two electrical conductors housed in insulation having a flat side and a keyed side.

* * * * *